(12) United States Patent
Kao et al.

(10) Patent No.: US 10,734,835 B2
(45) Date of Patent: Aug. 4, 2020

(54) POWER BYPASS APPARATUS WITH CURRENT-SHARING FUNCTION AND METHOD OF CONTROLLING THE SAME

(71) Applicant: DELTA ELECTRONICS, INC., Taoyuan (TW)

(72) Inventors: Chao-Li Kao, Taoyuan (TW); Hung-Chieh Lin, Taoyuan (TW); Chao-Lung Kuo, Taoyuan (TW); Yi-Ping Hsieh, Taoyuan (TW); Jin-Zhong Huang, Taoyuan (TW); Po-Hsin Tseng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 198 days.

(21) Appl. No.: 16/052,914

(22) Filed: Aug. 2, 2018

(65) Prior Publication Data
US 2019/0190311 A1    Jun. 20, 2019

(30) Foreign Application Priority Data
Dec. 20, 2017    (CN) .......................... 2017 1 1382273

(51) Int. Cl.
| H02J 7/04 | (2006.01) |
|---|---|
| H02J 7/00 | (2006.01) |
| H02J 9/06 | (2006.01) |
| H02M 7/04 | (2006.01) |

(52) U.S. Cl.
CPC ............... *H02J 9/061* (2013.01); *H02M 7/04* (2013.01)

(58) Field of Classification Search
CPC .... H02J 9/061; H02J 3/46; H02J 3/005; H02J 9/06; H02M 7/04
See application file for complete search history.

(56) References Cited

U.S. PATENT DOCUMENTS

| 2008/0228247 A1* | 9/2008 | Fung ....................... A61F 7/007 607/107 |
|---|---|---|
| 2009/0015207 A1* | 1/2009 | Ibrahim ................ H02J 7/0016 320/145 |
| 2012/0146410 A1* | 6/2012 | Shih ........................ H02J 9/06 307/23 |
| 2014/0354237 A1* | 12/2014 | Cotton .................. H02J 7/0016 320/134 |
| 2017/0253231 A1* | 9/2017 | Ciaccio ................. H01M 10/44 |

* cited by examiner

*Primary Examiner* — Jared Fureman
*Assistant Examiner* — Esayas G Yeshaw
(74) *Attorney, Agent, or Firm* — Muncy, Geissler, Olds & Lowe, P.C.

(57) ABSTRACT

A power bypass apparatus with a current-sharing function includes at least two bypass switch assemblies and a control unit. Each bypass switch assembly includes a controllable switch, a cooling unit, and a temperature detection unit. Each the temperature detection unit, correspondingly disposed to a heat-dissipating unit, detects a temperature value of the controllable switch to produce a temperature detection signal. The control unit receives the temperature detection signals and outputs at least two switch control signals to control at least one of the controllable switches or outputs at least two cooling unit control signals to control at least one of the cooling units, thus making currents flowing through the controllable switches identical. Accordingly, it is to increase overall efficiency of a power system and implement current-sharing function of the power system providing high power.

17 Claims, 10 Drawing Sheets

FIG.8

POWER BYPASS APPARATUS WITH CURRENT-SHARING FUNCTION AND METHOD OF CONTROLLING THE SAME

BACKGROUND

Technical Field

The present disclosure relates to a power bypass apparatus and a method of controlling the same, and more particularly to a power bypass apparatus with a current-sharing function and a method of controlling the same.

Description of Related Art

The statements in this section merely provide background information related to the present disclosure and do not necessarily constitute prior art.

Figure 1:
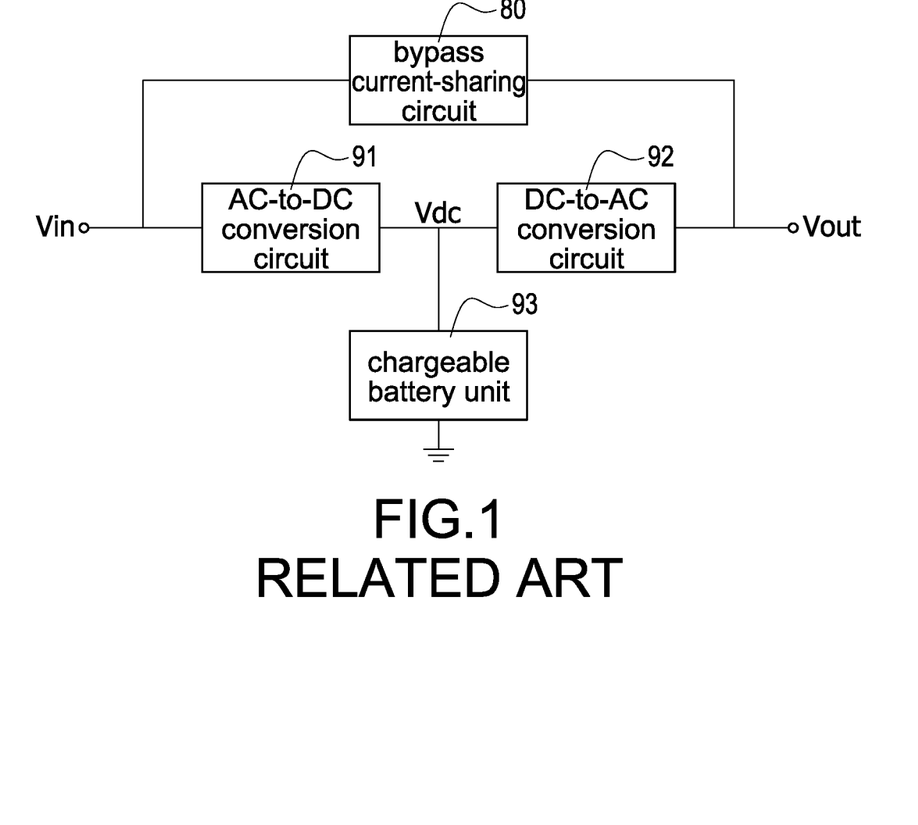
FIG. 1 is a block circuit diagram of an uninterruptible power supply (UPS) with a bypass current-sharing circuit of the related art.

Please refer to FIG. 1, which shows a block circuit diagram of an uninterruptible power supply (UPS) with a bypass current-sharing circuit of the related art. The UPS mainly includes an AC-to-DC conversion circuit 91, a DC-to-AC conversion circuit 92, a chargeable battery unit 93, and a bypass current-sharing circuit 80. The AC-to-DC conversion circuit 91 receives an AC input power source Vin and converts the AC input power source Vin into a DC voltage Vdc. The DC voltage Vdc charges the chargeable battery unit 93 to provide a backup power source. The AC-to-DC conversion circuit 91 has functions of rectification and power factor correction for rectifying the AC input power source Vin and correcting the power factor of the AC input power source Vin. The DC-to-AC conversion circuit 92 receives the DC voltage Vdc and converts the DC voltage Vdc into an AC output power source Vout to provide the required power to a rear-end load. Therefore, the AC output power source Vout is converted from the AC input power source Vin through a power conversion path on which the AC-to-DC conversion circuit 91 and the DC-to-AC conversion circuit 92 are formed.

In general, the bypass current-sharing circuit 80 is used for a power source system which needs a bypass conversion operation. Take the UPS as an example, the bypass current-sharing circuit 80 is operated at an ECO mode of the UPS, or at a faulty, overloaded, or overheated condition of the UPS. Also, thyristors are usually used as the bypass current-sharing circuit 80.

Take the thyristor, such as the triode AC semiconductor switch (TRIAC) as an example. Since the TRIAC has a negative temperature coefficient (NTC) characteristic, a temperature value of the TRIAC, which flowing through a larger current value, is increased to decrease an impedance thereof so that the current value flowing through the TRIAC is more increased. It would eventually lead to a vicious circle, which causes the current flows through the power bypass path of the same UPS, thereby causing a thermal runaway condition to result in the collapse of the power bypass function.

In order to solve the problem of the power bypass failure due to the thermal runaway caused in at least two parallel-connected UPSs, a large-value inductor is usually connected in series to the TRIAC. Please refer to FIG. 2A, which shows a circuit diagram of the bypass current-sharing circuit having a series-connected inductor of the related art. In this embodiment, a plurality of bypass current-sharing circuits 80 are correspondingly applied to small-power UPSs which are connected in parallel to each other. The bypass current-sharing circuit 80 of each UPS includes a silicon controlled switch 81, an inductor 82, and a current sensor 83. Also, the TRIAC is taken as the silicon controlled switch 81. Please refer to FIG. 2B, which shows a block circuit diagram of the bypass current-sharing circuit having the series-connected inductor of FIG. 2A applied to a small-power UPS. The two UPSs are a first UPS 901 and a second UPS 902, and each of the UPSs 901,902 includes the above-mentioned bypass current-sharing circuit 80, the AC-to-DC conversion circuit 91, the DC-to-AC conversion circuit 92, and the chargeable battery unit 93.

Figure 2A:
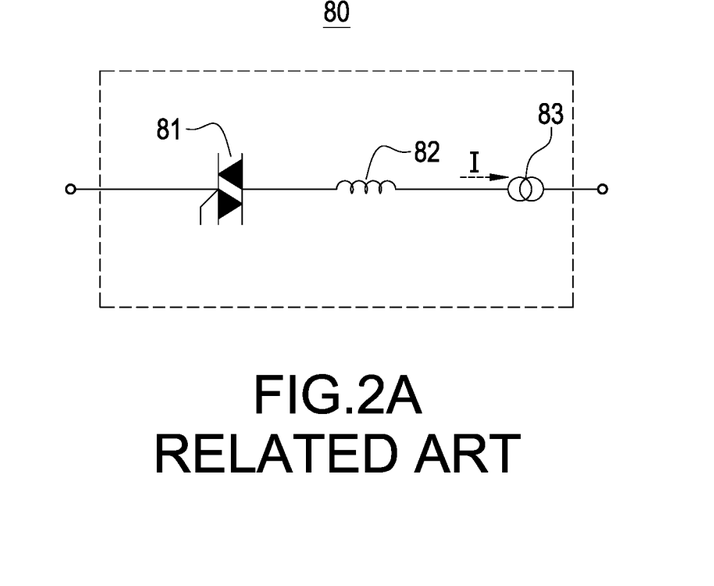
FIG. 2A is a circuit diagram of the bypass current-sharing circuit having a series-connected inductor of the related art.
Figure 2B:
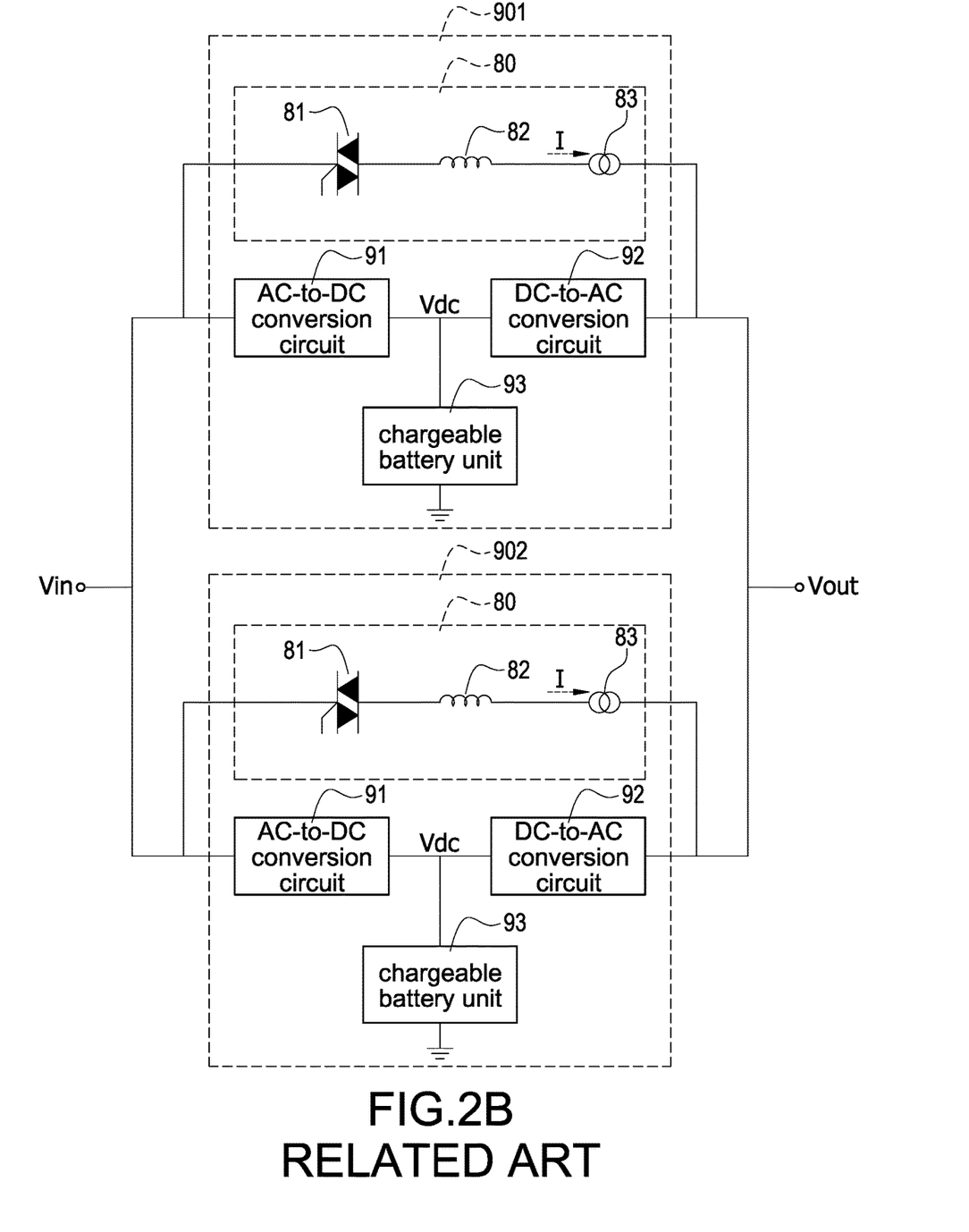
FIG. 2B is a block circuit diagram of the bypass current-sharing circuit having the series-connected inductor of FIG. 2A applied to a small-power UPS.

Since the inductor 82 has a positive temperature coefficient characteristic and the impedance of the inductor 82 is equal to or much larger than that of the silicon controlled switch 81, the equivalent impedance of the bypass current-sharing circuit 80 is dominated by the impedance of the inductor 82 so as to weaken the effect caused by the NTC characteristic of the silicon controlled switches 81. Moreover, a total current value I of the bypass current-sharing circuit 80 sensed by the current sensor 83 is provided to control a trigger angle of the silicon controlled switch 81 of each UPS, thereby implementing the bypass current-sharing operation of the two small-power UPSs.

However, the presence of the large-value inductors increases power consumption as well as circuit cost and circuit size, thereby reducing the overall efficiency of the UPS and violating the objective of improving the efficiency at the ECO mode.

Figure 3A:
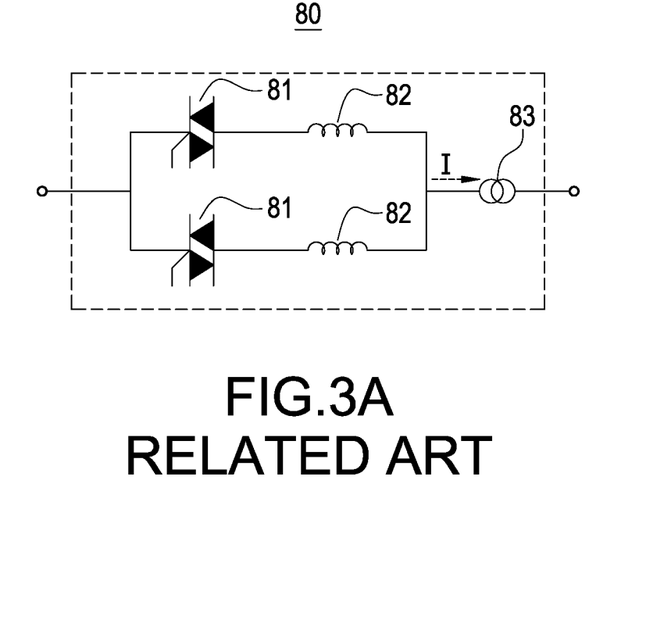
FIG. 3A is a circuit diagram of the bypass current-sharing circuit having a series-connected inductor of the related art.

Please refer to FIG. 3A, which shows a circuit diagram of the bypass current-sharing circuit having a series-connected inductor of the related art. The major difference between the FIG. 3A and the FIG. 2A is that the bypass current-sharing circuit of the former is applied to the large-power UPS. Therefore, each bypass current-sharing circuit 80 includes the current sensor 83 and two series-connected branches having two silicon controlled switches 81 and two inductors 82 connected to the current sensor 83. Also, two parallel-connected large-power UPSs are exemplified and shown in FIG. 3B.

Figure 3B:
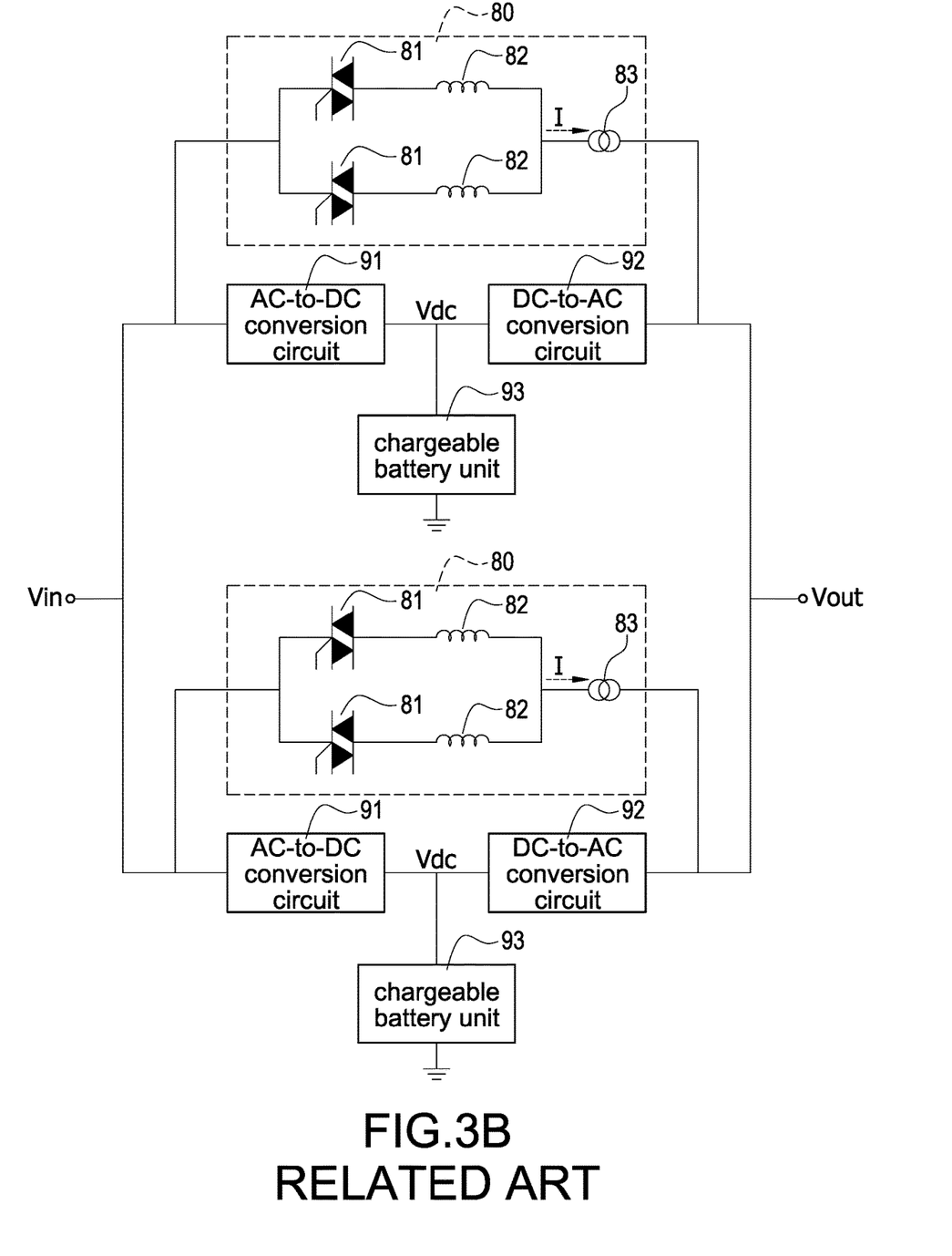
FIG. 3B is a block circuit diagram of the bypass current-sharing circuit having the series-connected inductor of FIG. 3A applied to a large-power UPS.

Both the parallel-connected small-power UPSs shown in FIG. 2B and the parallel-connected large-power UPSs shown in FIG. 3B, each bypass current-sharing circuit 80 only has one current sensor 83 for sensing the total current value I of the bypass current-sharing circuit 80. In other words, the only one current sensor 83 fails to sense a current value flowing through the respective series-connected branch in the large-power UPS. Therefore, it fails to control the trigger angle of the silicon controlled switch 81 at the respective series-connected branch according to the sensed total current value I so that the bypass current-sharing operation between the series-connected branches in the large-power UPS or other power source system cannot achieve.

SUMMARY

An objective of the present disclosure is to provide a power bypass apparatus with a current-sharing function to solve the above-mentioned problems of the power bypass failure due to the thermal runaway, the reduction of the overall efficiency, and the control failure of the bypass current-sharing operation in the large-power UPS.

In order to achieve the above-mentioned objective, the power bypass apparatus with the current-sharing function includes at least two bypass switch assemblies and a control unit. The at least two bypass switch assemblies are correspondingly applied to at least two power supplies. Each bypass switch assembly includes a controllable switch, a cooling unit, and a temperature detection unit. The controllable switch is disposed on a heat dissipation unit. The cooling unit is correspondingly disposed to the heat dissipation unit, and the cooling unit cools the controllable switch according to a cooling capacity of the cooling unit. The temperature detection unit is correspondingly disposed to the heat dissipation unit, and the temperature detection unit detects a temperature value of the controllable switch and produces a temperature detection signal having information of the temperature value. The control unit is coupled to the at least two bypass switch assemblies and receives the temperature detection signals. The control unit outputs at least two switch control signals and at least two cooling unit control signals corresponding to the at least two bypass switch assemblies according to the temperature detection signals, and controls a switch turned-on duration of at least one of the controllable switches according to the at least two switch control signals or controls a cooling capacity of at least one of the cooling units according to the at least two cooling unit control signals so that current values flowing through the controllable switches are identical.

In one embodiment, the switch turned-on duration of the at least one of the controllable switches is fully turned-on.

In one embodiment, each of the controllable switches has a negative temperature coefficient (NTC) characteristic.

In one embodiment, each of the controllable switches is a triode AC semiconductor switch (TRIAC), and at least one of the switch control signals correspondingly controls a trigger angle of the TRIAC so that the switch turned-on duration of the at least one of the controllable switches is controlled.

In one embodiment, each of the controllable switches is a silicon controlled rectifying module composed of two silicon controlled rectifiers connected inverse parallel to each other, and at least one of the switch control signals correspondingly controls a trigger angle of the silicon controlled rectifying module so that the switch turned-on duration of the at least one of the controllable switches is controlled.

In one embodiment, the switch turned-on duration of the TRIAC is decreased, the current value flowing through the TRIAC is decreased; when the switch turned-on duration of the TRIAC is increased, the current value flowing through the TRIAC is increased.

In one embodiment, the switch turned-on duration of the silicon controlled rectifying module is decreased, the current value flowing through the silicon controlled rectifying module is decreased; when the switch turned-on duration of the silicon controlled rectifying module is increased, the current value flowing through the silicon controlled rectifying module is increased.

In one embodiment, the cooling unit is a fan unit, and the cooling unit control signal controls a speed of the fan unit.

In one embodiment, when the speed turned-on cycle is increased, the cooling capacity of the cooling unit is increased so that the temperature value of the controllable switch is decreased and the current value flowing through the controllable switch is decreased; when the speed turned-on cycle is decreased, the cooling capacity of the cooling unit is decreased so that the temperature value of the controllable switch is increased and the current value flowing through the controllable switch is increased.

Accordingly, the power bypass apparatus with the current-sharing function is implemented to avoid the power bypass failure due to the thermal runaway, increase the overall efficiency, and achieve the bypass current-sharing operation in the large-power UPS.

Another objective of the present disclosure is to provide a power bypass apparatus with a current-sharing function to solve the above-mentioned problems of the power bypass failure due to the thermal runaway, the reduction of the overall efficiency, and the control failure of the bypass current-sharing operation in the large-power UPS.

In order to achieve the above-mentioned objective, the power bypass apparatus with the current-sharing function includes at least two bypass switch assemblies and a control unit. The at least two bypass switch assemblies are correspondingly applied to at least two power supplies. Each bypass switch assembly includes a first controllable switch, a second controllable switch, a cooling unit, and a temperature detection unit. The first controllable switch is disposed on a heat dissipation unit. The second controllable switch is disposed on the heat dissipation unit and is coupled in parallel to the first controllable switch. The cooling unit is correspondingly disposed to the heat dissipation unit, and the cooling unit cools the first controllable switch and the second controllable switch according to a cooling capacity of the cooling unit. The temperature detection unit is correspondingly disposed to the heat dissipation unit, and the temperature detection unit detects a temperature value of the first controllable switch and the second controllable switch and produces a temperature detection signal having information of the temperature value. The control unit is coupled to the at least two bypass switch assemblies and receives the temperature detection signals. The control unit outputs at least two switch control signals and at least two cooling unit control signals corresponding to the at least two bypass switch assemblies according to the temperature detection signals, and controls a switch turned-on duration of one of the first controllable switch and the second controllable switch according to the at least two switch control signals or controls a cooling capacity of at least one of the cooling units according to the at least two cooling unit control signals so that current values flowing through the first controllable switch and the second controllable switch are identical.

In one embodiment, the switch turned-on duration of the at least one of the first controllable switches and the second controllable switches is fully turned-on.

In one embodiment, each of the first controllable switches and the second controllable switches has a negative temperature coefficient (NTC) characteristic.

In one embodiment, each of the first controllable switches and the second controllable switches is a triode AC semiconductor switch (TRIAC), and at least one of the switch control signals correspondingly controls a trigger angle of the TRIAC so that the switch turned-on duration of the at least one of the first controllable switches and the second controllable switches is controlled.

In one embodiment, each of the first controllable switches and the second controllable switches is a silicon controlled rectifying module composed of two silicon controlled rectifiers connected inverse parallel to each other, and at least one of the switch control signals correspondingly control a trigger angle of the silicon controlled rectifying module so that the switch turned-on duration of the at least one of the first controllable switches and the second controllable switches is controlled.

Accordingly, the power bypass apparatus with the current-sharing function is implemented to avoid the power bypass failure due to the thermal runaway, increase the overall efficiency, and achieve the bypass current-sharing operation in the large-power UPS.

Further another objective of the present disclosure is to provide a current-sharing control method to solve the above-mentioned problems of the power bypass failure due to the thermal runaway, the reduction of the overall efficiency, and the control failure of the bypass current-sharing operation in the large-power UPS.

In order to achieve the above-mentioned objective, the current-sharing control method is applied to a power bypass apparatus having at least two power supplies. The power bypass apparatus includes at least two bypass switch assemblies and a control unit, and each of the bypass switch assemblies includes a controllable switch disposed on a heat dissipation unit, a cooling unit correspondingly disposed to the heat dissipation unit, and a temperature detection unit correspondingly disposed to the heat dissipation unit. The current-sharing control method includes steps of: detecting a temperature value of each controllable switch unit by each temperature detection unit; producing a temperature detection signal having information of the temperature value by each temperature detection unit; receiving the temperature detection signals by the control unit; and outputting at least two switch control signals and at least two cooling unit control signals corresponding to the at least two bypass switch assemblies according to the temperature detection signals, and controlling a switch turned-on duration of at least one of the controllable switches according to the at least two switch control signals or controlling a cooling capacity of at least one of the cooling units according to the at least two cooling unit control signals so that current values flowing through the controllable switches are identical.

In one embodiment, the switch turned-on duration of the at least one of the controllable switches is fully turned-on.

In one embodiment, each of the controllable switches has a negative temperature coefficient (NTC) characteristic.

Accordingly, the current-sharing control method is implemented to avoid the power bypass failure due to the thermal runaway, increase the overall efficiency, and achieve the bypass current-sharing operation in the large-power UPS.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Reference will now be made to the drawing figures to describe the present disclosure in detail. It will be understood that the drawing figures and exemplified embodiments of present disclosure are not limited to the details thereof.

Figure 4A:
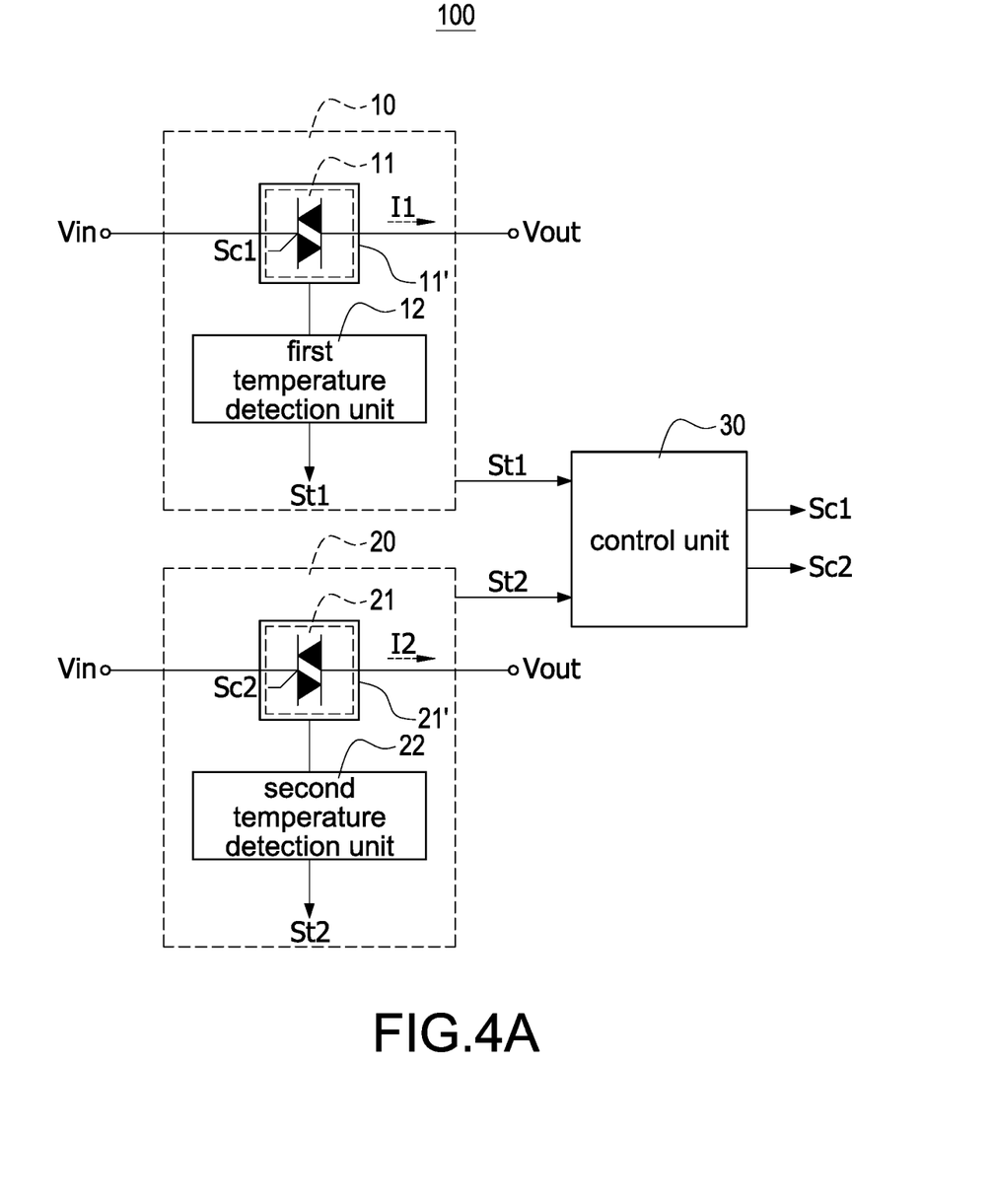
FIG. 4A is a schematic block circuit diagram of a power bypass apparatus with a current-sharing function according to a first embodiment of the present disclosure.

Please refer to FIG. 4A, which shows a schematic block circuit diagram of a power bypass apparatus with a current-sharing function according to a first embodiment of the present disclosure. In the first embodiment, there are plural small-power UPSs are operated in parallel. Also, a switch turned-on duration of a bypass switch assembly is controlled to achieve the current-sharing operation of the power supplier described in detail later. Take the UPS shown in FIG. 1 for example, the power bypass apparatus with the current-sharing function 100 (hereinafter referred to as "power bypass apparatus 100") is applied to at least two small-power UPSs for sharing current among power bypass paths of the at least two UPSs. The power bypass apparatus 100 includes at least two bypass switch assemblies 10,20 and a control unit 30. In this embodiment, the at least two bypass switch assemblies include a first bypass switch assembly 10 and a second bypass switch assembly 20. In addition, only the power bypass apparatus 100 is specifically shown in FIG. 4A and other circuits of the UPS can be referred to FIG. 1, FIG. 2B, and FIG. 3B.

The first bypass switch assembly 10 includes a first controllable switch 11 and a first temperature detection unit 12. The first temperature detection unit 12 is correspondingly disposed to the first controllable switch 11 to detect a temperature of the first controllable switch 11 (namely a first temperature value T1) and produce a first temperature detection signal St1 having information of the first temperature value T1. The second bypass switch assembly 20 includes a second controllable switch 21 and a second temperature detection unit 22. The second temperature detection unit 22 is correspondingly disposed to the second controllable switch 21 to detect a temperature of the second controllable switch 21 (namely a second temperature value T2) and produce a second temperature detection signal St2 having information of the second temperature value T2. The so-called "correspondingly disposed to" means that the temperature detection units 12,22 may provide temperature detections of the controllable switches 11,21 in any form of coupling, proximity, or co-packaging. The so-called "controllable" means that the controllable switches 11,21 can be controlled by the turned-on duration thereof or other manners. In this embodiment, each of the first controllable switch 11 and the second controllable switch 21 may be a triode AC semiconductor switches (TRIAC), a silicon controlled rectifying module composed of two silicon controlled rectifiers (SCRs) connected inverse parallel to each other, or other semiconductor switch elements. Also, the each of the first temperature detection unit 12 and the second temperature detection unit 22 may be, for example but not limited to, a thermal sensing element.

In this embodiment, the first controllable switch 11 is disposed on a first heat dissipation unit 11', and the first heat dissipation unit 11' is, for example but not limited to, a heat sink, a cooling module, or other components or devices with the heat-dissipating function. Therefore, the first temperature detection unit 12 may directly or indirectly detect a temperature of the first heat dissipation unit 11' to acquire the information of the first temperature value T1. Similarly, the second controllable switch 21 is disposed on a second heat dissipation unit 21', and the second temperature detection unit 22 may directly or indirectly detect a temperature of the second heat dissipation unit 21' to acquire the information of the second temperature value T2.

The control unit 30 is coupled to or communicated with the first temperature detection unit 12 and the second temperature detection unit 22 to receive the first temperature detection signal St1 transmitted from the first temperature detection unit 12 and the second temperature detection signal St2 transmitted from the second temperature detection unit 22. Therefore, the control unit 30 acquires the temperature value of the first controllable switch 11 according to the first temperature detection signal St1 and the temperature value of the second controllable switch 21 according to the second temperature detection signal St2.

The control unit 30 is further coupled to the first controllable switch 11 of the first bypass switch assembly 10 and a second controllable switch 21 of the second bypass switch assembly 20. According to the first temperature detection signal St1 and the second temperature detection signal St2, the control unit 30 outputs at least two control signals, such as a first switch control signal Sc1 and a second switch control signal Sc2 corresponding to the at least two bypass switch assemblies. The first switch control signal Sc1 is provided to control the first controllable switch 11 of the first bypass switch assembly 10 and the second switch control signal Sc2 is provided to control the second controllable switch 21 of the second bypass switch assembly 20. In one embodiment, the first switch control signal Sc1 and the second switch control signal Sc2 are provided to control a turned-on duration of at least one of the first controllable switch 11 and the second controllable switch 21. For example, the turned-on duration of the first controllable switch 11 is controlled by the first switch control signal Sc1 but the turned-on duration of the second controllable switch 21 is not controlled by the second switch control signal Sc2. Alternatively, the turned-on duration of the second controllable switch 21 is controlled by the second switch control signal Sc2 but the turned-on duration of the first controllable switch 11 is not controlled by the first switch control signal Sc1. Therefore, a first current value I1 flowing through the first controllable switch 11 is equal to a second current value I2 flowing through the second controllable switch 21 to achieve the bypass current-sharing operation among a plurality of UPSs, such as two UPSs in this embodiment.

In addition, the control unit 30 is not limited to a single controller as shown in FIG. 4A. For example, if the first bypass switch assembly 10 and the second bypass switch assembly 20 are installed in the same module, only the single controller is used to be the control unit 30. If the first bypass switch assembly 10 and the second bypass switch assembly 20 are separately installed in two UPSs, two controllers are respectively provided to the two UPSs and the two controllers are communicated with each other or communicated with another controller installed in an external UPS.

Figure 4B:
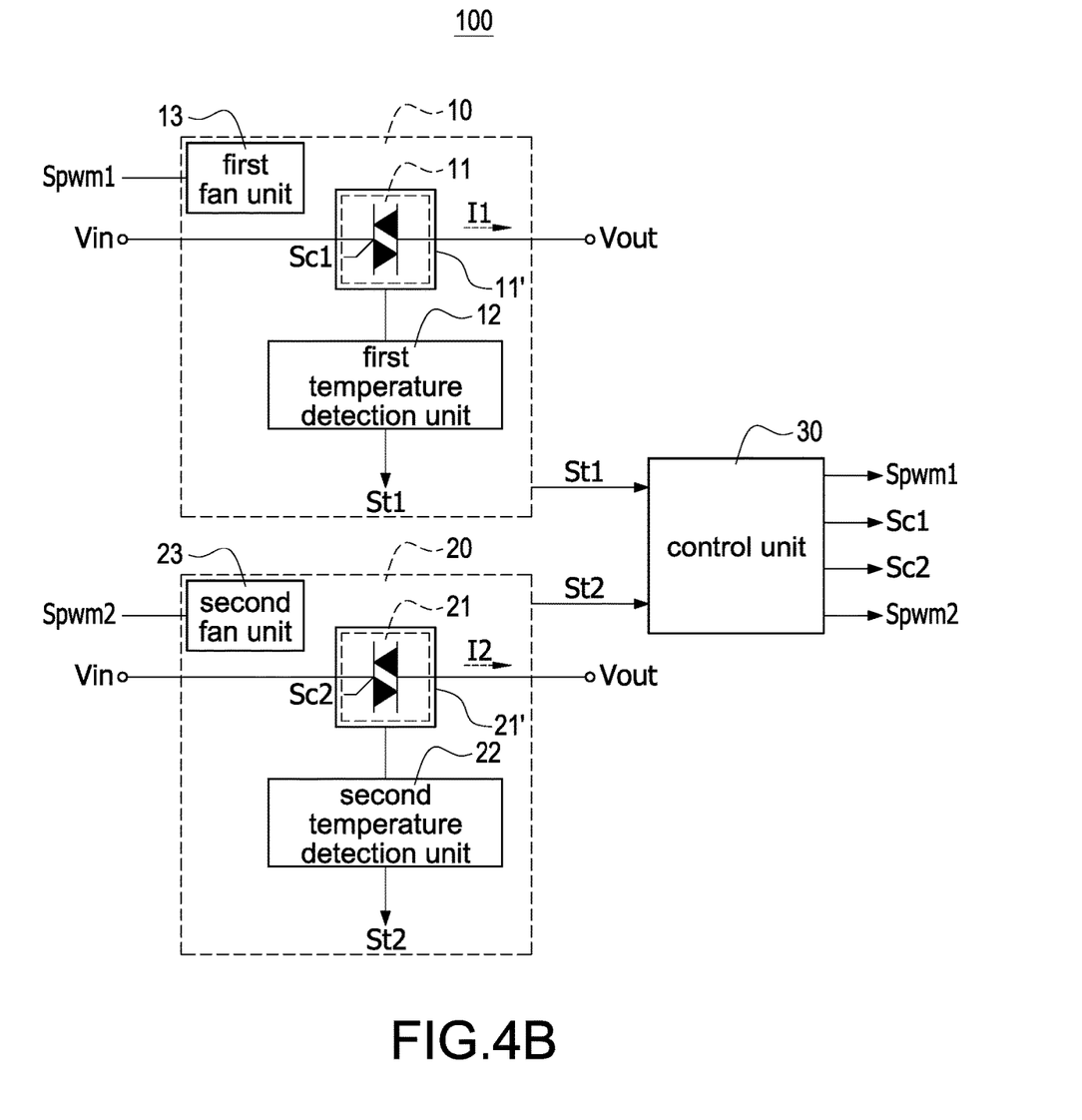
FIG. 4B is a schematic block circuit diagram of the power bypass apparatus with the current-sharing function according to a second embodiment of the present disclosure.

Please refer to FIG. 4B, which shows a schematic block circuit diagram of the power bypass apparatus with the current-sharing function according to a second embodiment of the present disclosure. The major difference between the second embodiment and the first embodiment is that a cooling capacity of the cooling unit is used to achieve the bypass current-sharing operation. The cooling unit may be a fan or a water-cooling motor, and the rotation speed of the fan or that of the water-cooling motor is controlled to change the cooling capacity of the cooling unit. For example, the cooling capacity of the fan is increased by increasing the rotation speed of the fan, or the cooling capacity of the water-cooling motor is increased by increasing the rotation speed of the water-cooling motor. For convenience, the fan unit is exemplified for further demonstration in the second embodiment.

The first bypass switch assembly 10 further includes a first fan unit 13. The first fan unit 13 is correspondingly disposed to the first heat dissipation unit 11' on which the first controllable switch 11 is disposed, and therefore the amount of airflow provided by the first fan unit 13 may cover the first heat dissipation unit 11' to remove heat generated by the first controllable switch 11 by controlling the rotation speed of the first fan unit 13. Similarly, the second bypass switch assembly 20 further includes a second fan unit 23. The second fan unit 23 is correspondingly disposed to the second heat dissipation unit 21' on which the second controllable switch 21 is disposed, and therefore the amount of airflow provided by the second fan unit 23 may cover the second heat dissipation unit 21' to remove heat generated by the second controllable switch 21 by controlling the rotation speed of the second fan unit 23.

More specifically, the control unit 30 outputs a first fan control signal Spwm1 and a second fan control signal Spwm2 corresponding to the two bypass switch assemblies 10,20 according to the first temperature detection signal St1 and the second temperature detection signal St2 to control the first fan unit 13 and the second fan unit 23, respectively. In this embodiment, if the first fan unit 13 and the second fan unit 23 are PWM fans, the first fan control signal Spwm1 and the second fan control signal Spwm2 may be the PWM signals. Also, a duty cycle of the PWM signal is adjusted to control the speed of at least one of the first fan unit 13 and the second fan unit 23. The two current-sharing functions of controlling the switch turned-on duration and the fan speed will be described in detail later.

Figure 5A:
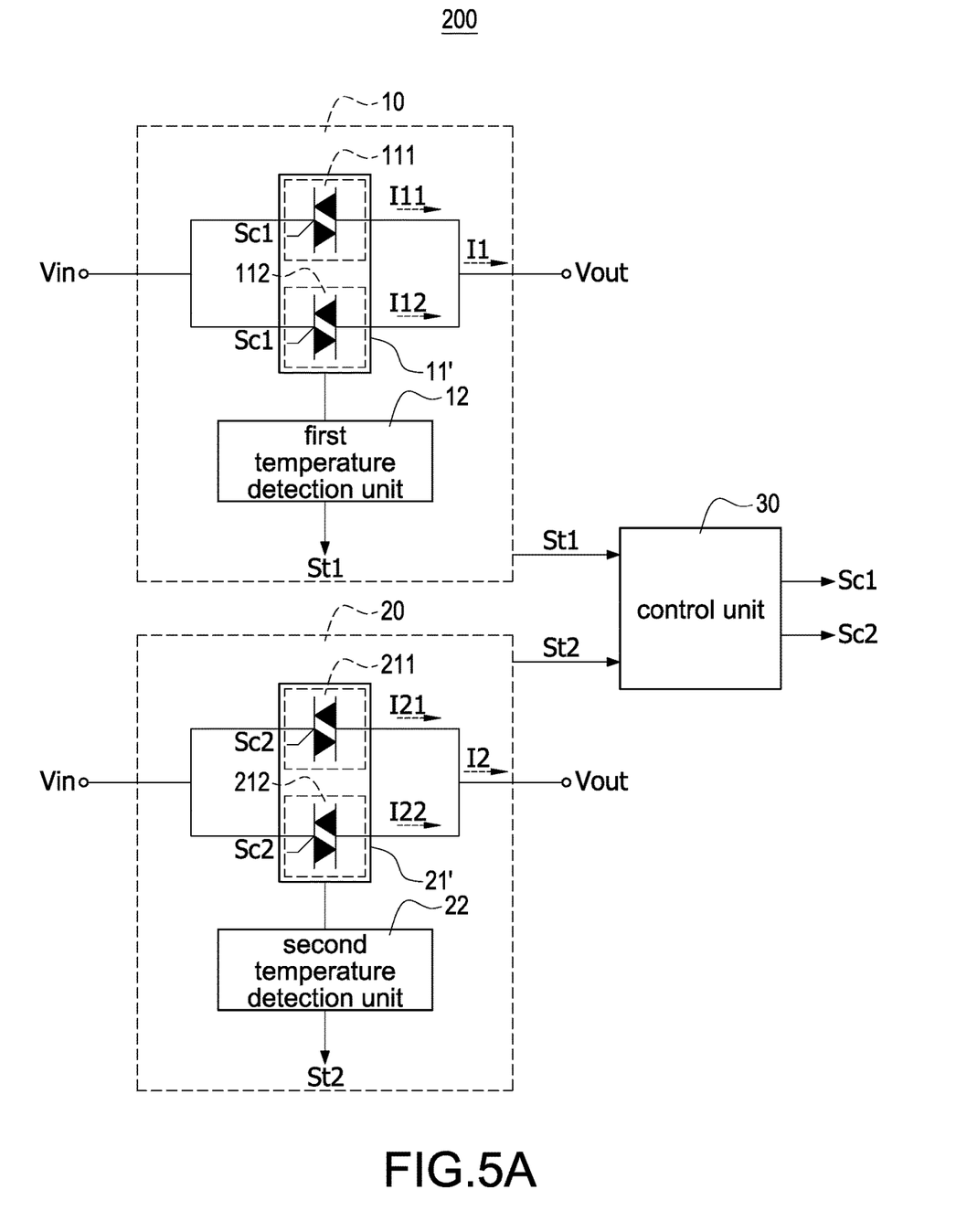
FIG. 5A is a schematic block circuit diagram of the power bypass apparatus with the current-sharing function according to a third embodiment of the present disclosure.

Please refer to FIG. 5A, which shows a schematic block circuit diagram of the power bypass apparatus with the current-sharing function according to a third embodiment of the present disclosure. In the third embodiment, there are plural large-power UPSs are operated in parallel. Take the UPS shown in FIG. 1 for example, the power bypass apparatus with the current-sharing function 200 (hereinafter referred to as "power bypass apparatus 200") is applied to at least two large-power UPSs for sharing current among power bypass paths of the at least two UPSs. The power bypass apparatus 200 includes at least two bypass switch assemblies 10,20 and a control unit 30. In this embodiment, the at least two bypass switch assemblies include a first bypass switch assembly 10 and a second bypass switch assembly 20. In addition, only the power bypass apparatus 200 is specifically shown in FIG. 5A and other circuits of the UPS can be referred to FIG. 1, FIG. 2B, and FIG. 3B.

The first bypass switch assembly 10 includes a first controllable switch 111, a second controllable switch 112, and a first temperature detection unit 12. The second controllable switch 112 is coupled in parallel to the first controllable switch 111. The first temperature detection unit 12 is correspondingly disposed to the first controllable switch 111 and the second controllable switch 112 to detect a first temperature value T1 of the first controllable switch 111 and the second controllable switch 112 and produce a first temperature detection signal St1 having information of the first temperature value T1.

The second bypass switch assembly 20 includes a third controllable switch 211, a fourth controllable switch 212, and a second temperature detection unit 22. The fourth controllable switch 212 is coupled in parallel to the third controllable switch 211. The second temperature detection unit 22 is correspondingly disposed to the third controllable switch 211 and the fourth controllable switch 212 to detect a second temperature value T2 of the third controllable switch 211 and the fourth controllable switch 212 and produce a second temperature detection signal St2 having information of the second temperature value T2.

In this embodiment, the first controllable switch 111 and the second controllable switch 112 are disposed on a first heat dissipation unit 11', and the first heat dissipation unit 11' is, for example but not limited to, a heat sink, a cooling module, or other components or devices with the heat-dissipating function. Therefore, the first temperature detection unit 12 may directly or indirectly detect a temperature of the first heat dissipation unit 11' to acquire a first temperature value T1. Similarly, the third controllable switch 211 and the fourth controllable switch 212 are disposed on a second heat dissipation unit 21', and the second temperature detection unit 22 may directly or indirectly detect a temperature of the second heat dissipation unit 21' to acquire a second temperature value T2. In this embodiment, the first temperature value T1 detected by the first temperature detection unit 12 is the temperature of the first heat dissipation unit 11' and it is also regarded as a temperature of the first controllable switch 111 and a temperature of the second controllable switch 112. Similarly, the second temperature value T2 detected by the second temperature detection unit 22 is the temperature of the second heat dissipation unit 21' and it is also regarded as a temperature of the third controllable switch 211 and a temperature of the fourth controllable switch 212.

In another embodiment, the first controllable switch 111 and the second controllable switch 112 may be separately disposed on two different heat dissipation units, namely each controllable switch is correspondingly disposed on one heat dissipation unit. Therefore, a temperature detection unit assembly having two temperature detection units is used to detect temperature values of the two heat dissipation units and the current-sharing operation is performed according to the detected temperature values. Similarly, the third controllable switch 211 and the fourth controllable switch 212 may be separately disposed on two different heat dissipation units for the temperature detection and the current-sharing control which is similar to that the plural controllable switches are disposed on the same heat dissipation unit for the temperature detection and the current-sharing control.

The control unit 30 is coupled to the first temperature detection unit 12 and the second temperature detection unit 22 to receive the first temperature detection signal St1 transmitted from the first temperature detection unit 12 and the second temperature detection signal St2 transmitted from the second temperature detection unit 22. Therefore, the control unit 30 acquires the temperature values of the first controllable switch 111 and the second controllable switch 112 according to the first temperature detection signal St1 and acquires the temperature values of the third controllable switch 211 and the fourth controllable switch 212 according to the second temperature detection signal St2.

The control unit 30 is further coupled to the first controllable switch 111 and the second controllable switch 112 of the first bypass switch assembly 10 and a third controllable switch 211 and the fourth controllable switch 212 of the second bypass switch assembly 20. According to the first temperature detection signal St1 and the second temperature detection signal St2, the control unit 30 outputs at least two control signals, such as a first switch control signal Sc1 and a second switch control signal Sc2 corresponding to the at least two bypass switch assemblies. The first switch control signal Sc1 is provided to control the first controllable switch 111 and the second controllable switch 112 of the first bypass switch assembly 10 and the second switch control signal Sc2 is provided to control the third controllable switch 211 and the fourth controllable switch 212 of the second bypass switch assembly 20. In one embodiment, the turned-on duration of the first controllable switch 111 and the second controllable switch 112 is controlled by changing the trigger angle of the first switch control signal Sc1 but the turned-on duration of the third controllable switch 211 and the fourth controllable switch 212 is not controlled by the second switch control signal Sc2. In another embodiment, the turned-on duration of the third controllable switch 211 and the fourth controllable switch 212 is controlled by changing the trigger angle of the second switch control signal Sc2 but the turned-on duration of the first controllable switch 111 and the second controllable switch 112 is not controlled by the first switch control signal Sc1. Therefore, the first current value I11 flowing through the first controllable switch 111, the second current value I12 flowing through the second controllable switch 112, the third current value I21 flowing through the third controllable switch 211, and the fourth current value I22 flowing through the fourth controllable switch 212 are identical and also the first total current value I1 and the second total current value I2 outputted from the power bypass paths of the two UPSs, namely $I11=I12=I21=I22=\frac{1}{2}\times I1=\frac{1}{2}\times I2$, thereby achieving the bypass current-sharing operation among a plurality of large-power UPSs, such as two UPSs in this embodiment.

Figure 5B:
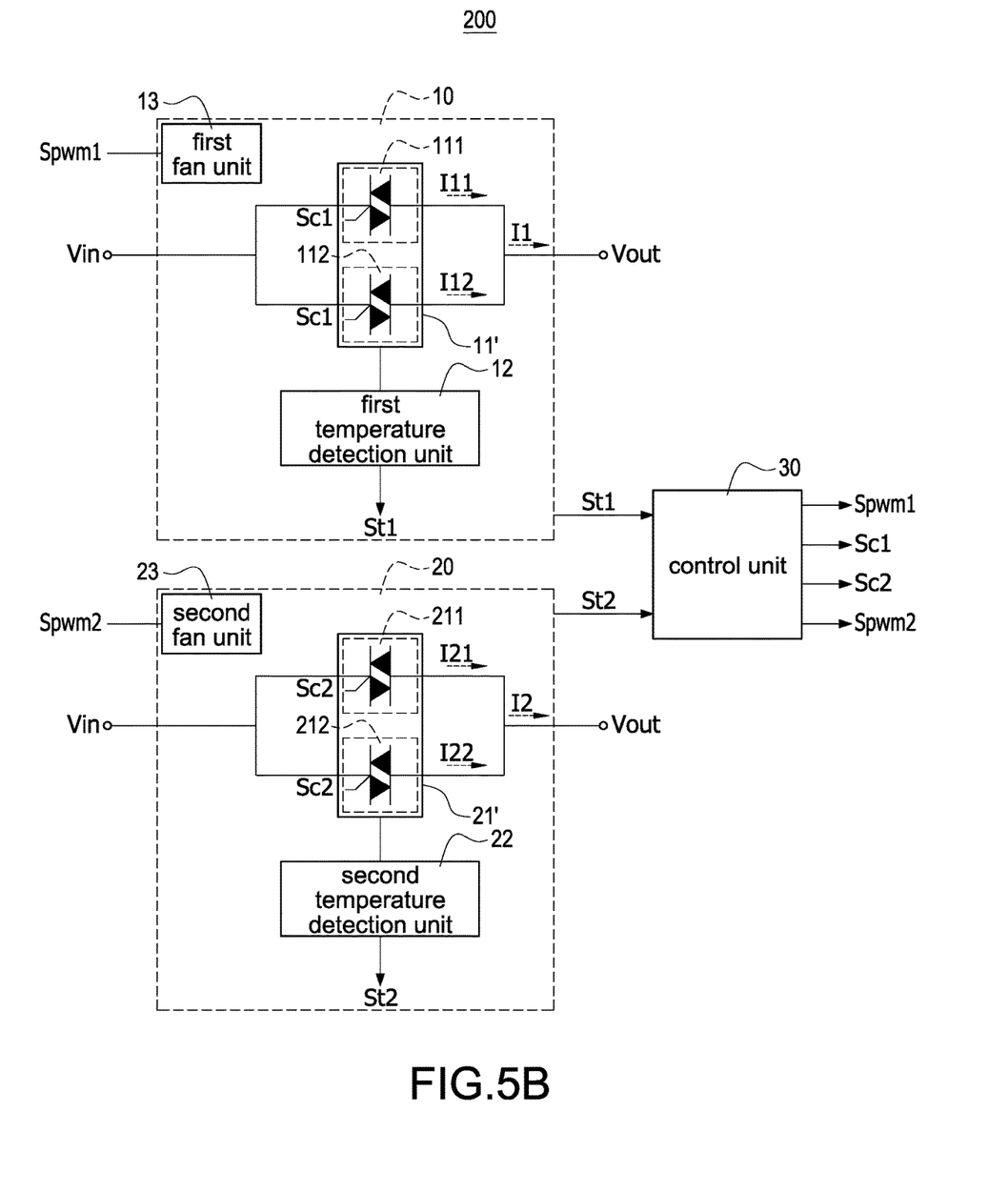
FIG. 5B is a schematic block circuit diagram of the power bypass apparatus with the current-sharing function according to a fourth embodiment of the present disclosure.

Please refer to FIG. 5B, which shows a schematic block circuit diagram of the power bypass apparatus with the current-sharing function according to a fourth embodiment of the present disclosure. The major difference between the fourth embodiment and the third embodiment is that the former. The major difference between the fourth embodiment and the third embodiment is that a cooling capacity of the cooling unit is used to achieve the bypass current-sharing operation. The cooling unit may be a fan or a water-cooling motor, and the rotation speed of the fan or that of the water-cooling motor is controlled to change the cooling capacity of the cooling unit. For example, the cooling capacity of the fan is increased by increasing the rotation speed of the fan, or the cooling capacity of the water-cooling motor is increased by increasing the rotation speed of the water-cooling motor. For convenience, the fan unit is exemplified for further demonstration in the fourth embodiment.

The first bypass switch assembly 10 further includes a first fan unit 13. The first fan unit 13 is correspondingly disposed to the first heat dissipation unit 11' on which the first controllable switch 111 and the second controllable switch 112 are disposed, and therefore the amount of airflow provided by the first fan unit 13 may cover the first heat dissipation unit 11' to remove heat generated by the first controllable switch 111 and the second controllable switch 112 by controlling the rotation speed of the first fan unit 13. Similarly, the second bypass switch assembly 20 further includes a second fan unit 23. The second fan unit 23 is correspondingly disposed to the second heat dissipation unit 21' on which the third controllable switch 211 and the fourth controllable switch 212 are disposed, and therefore the amount of airflow provided by the second fan unit 23 may cover the second heat dissipation unit 21' to remove heat generated by the third controllable switch 211 and the fourth controllable switch 212 by controlling the rotation speed of the second fan unit 23.

More specifically, the control unit 30 outputs a first fan control signal Spwm1 and a second fan control signal Spwm2 corresponding to the two bypass switch assemblies 10,20 according to the first temperature detection signal St1 and the second temperature detection signal St2 to control the first fan unit 13 and the second fan unit 23, respectively. In this embodiment, if the first fan unit 13 and the second fan unit 23 are PWM fans, the first fan control signal Spwm1 and the second fan control signal Spwm2 may be the PWM signals. Also, a duty cycle of the PWM signal is adjusted to control the speed of at least one of the first fan unit 13 and the second fan unit 23. The two current-sharing functions of controlling the switch turned-on duration and the fan speed will be described in detail later.

Figure 6A:
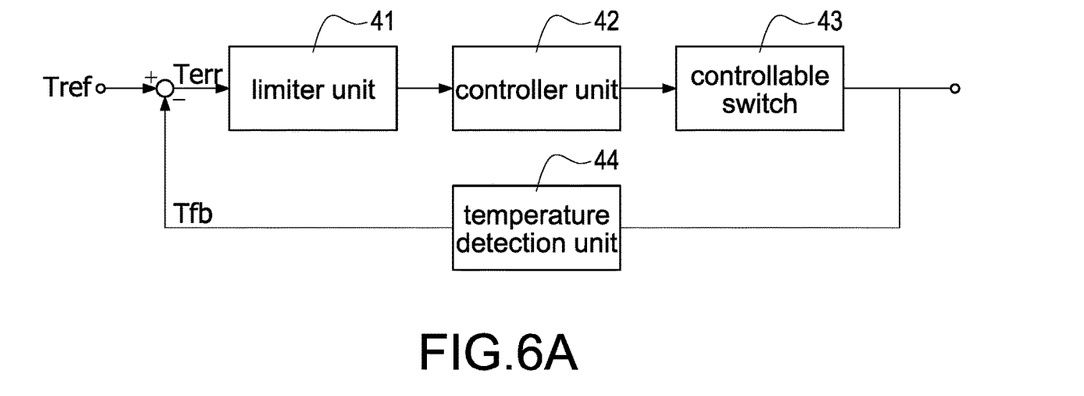
FIG. 6A is a schematic block diagram of controlling a controllable switch of the power bypass apparatus with the current-sharing function according to the present disclosure.

Please refer to FIG. 6A, which shows a schematic block diagram of controlling a controllable switch of the power bypass apparatus with the current-sharing function according to the present disclosure. The temperature feedback control is a negative closed-loop feedback control, which is composed of a limiter unit 41, a controller unit 42, a controllable switch 43, and a temperature detection unit 44. Also refer to FIG. 4A, the two small-power UPSs respectively provide the first controllable switch 11 and the second controllable switch 21, and therefore two temperature feedback controls are provided and one control plant is the first controllable switch 11 and the other control plant is the second controllable switch 21. Also, the first temperature detection unit 12 and the second temperature detection unit 22 are two temperature detection units 44 in the two temperature feedback controls. In this embodiment, the feedback controls may be implemented by the control unit 30 in an analog manner or a digital manner. Moreover, the temperature feedback controls could be applied to the embodiment shown in FIG. 5A and the detail description is omitted here for conciseness.

In this embodiment, since the turned-on duration of the at least one of the first controllable switch 11 and the second controllable switch 21 can be controlled, the temperature feedback control includes a limiter unit 41 (also referred to as "limiter") to limit one of the first controllable switch 11 and the second controllable switch 21, and the detail operations of the limiter unit 41 will be described in detail later.

In the temperature feedback control, an average temperature value of the first temperature value T1 and the second temperature value T2 is, but not limited to, set to a temperature reference value Tref, namely Tref=½(T1+T2). Alternatively, a weighting factor may be introduced to the first temperature value T1 and the second temperature value T2 to set the temperature reference value Tref. The first temperature value T1 sensed by the first temperature detection unit 12 may be set to a temperature feedback value Tfb, namely Tfb=T1.

Figure 7:
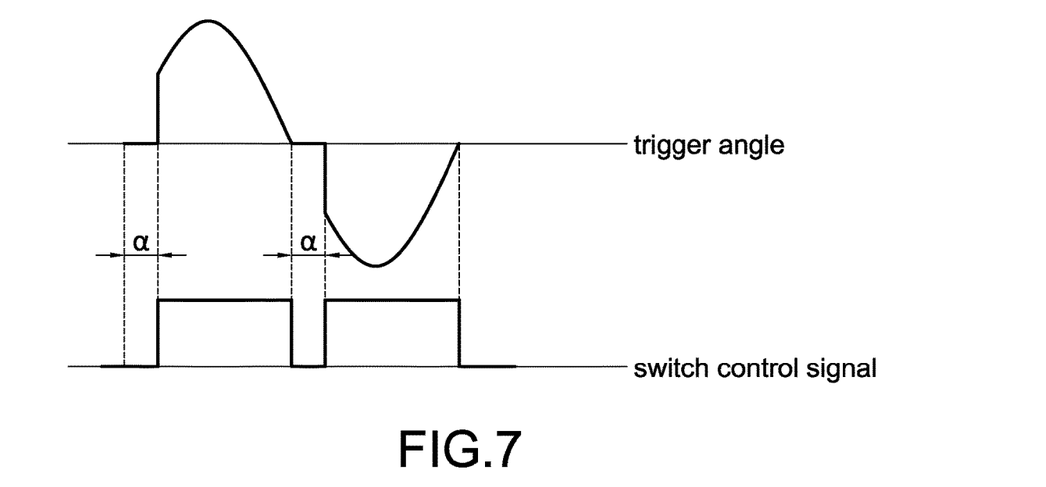
FIG. 7 is a schematic view of controlling a trigger angle of the controllable switch of FIG. 6A.

Also refer to FIG. 7, which shows a schematic view of controlling a trigger angle of the controllable switch of FIG. 6A. When the temperature feedback value Tfb is greater than the temperature reference value Tref, namely T1>½(T1+T2), a difference value between the temperature reference value Tref and the temperature feedback value Tfb, namely a temperature error value Terr is negative. At this condition, the controller unit 42 decreases a switch turned-on duration of the first controllable switch 11 by controlling a trigger angle α shown in FIG. 7 of the first controllable switch 11, thereby reducing the first current value I1 flowing through the first controllable switch 11. When the first current value I1 is decreased, the first temperature value T1 (namely the temperature feedback value Tfb) of the first controllable switch 11 is correspondingly decreased. The controller unit 42 may provide a control rule, such as a PI (proportional-integral) control or a fuzzy control.

When the temperature feedback value Tfb is less than or equal to the temperature reference value Tref, namely T1<=½(T1+T2), the temperature error value Ten is positive or zero so that no output control is provided by the controller unit 42 and the trigger angle of the first controllable switch 11 is not changed.

Accordingly, the negative closed-loop feedback control is performed to make the temperature error value Ten be zero, namely the temperature feedback value Tfb is equal to the temperature reference value Tref, and therefore the first current value I1 flowing through the first controllable switch 11 is equal to the second current value I2 flowing through the second controllable switch 21 as shown in FIG. 4A, thereby achieving the bypass current-sharing operation among a plurality of UPSs, such as two UPSs in this embodiment.

As mentioned above, the limiter unit 41 is used to limit the adjustment of one of the first controllable switch 11 and the second controllable switch 21. In this embodiment, the limiter unit 41 is an amplitude limiter: an output of the limiter unit 41 is zero when the temperature error value Terr is positive, and a switch turned-on duration of the controllable switch 43 is controlled when the temperature error value Terr is negative. For example, when the first temperature value T1 of the first controllable switch 11 is greater than the temperature reference value Tref, namely T1>½(T1+T2), the temperature error value Terr between the temperature reference value Tref and the temperature feedback value Tfb is negative. At this condition, the controller unit 42 decreases the switch turned-on duration of the first controllable switch 11 by controlling the trigger angle α of the first controllable switch 11, thereby reducing the first current value I1 flowing through the first controllable switch 11. Relatively, the second temperature value T2 of the second controllable switch 21 is less than the temperature reference value Tref, namely T1<½(T1+T2). At this condition, the output of the limiter unit 41 is zero since the temperature error value Ten is positive and the controller unit 42 does not adjust the switch turned-on duration of the second controllable switch 21 to provide a full-cycle turned-on control. Accordingly, the limiter unit 41 is used to provide at least one bypass path by controlling at least one fully turned-on duration of the first controllable switch 11 and the second controllable switch 21.

In another embodiment, the four controllable switches may be separately disposed on four different heat dissipation units and four temperature detection units are used to correspondingly detect temperature values of different controllable switches, namely a first temperature value T1 of the first controllable switch 111, a second temperature value T2 of the second controllable switch 112, a third temperature value T3 of the third controllable switch 211, and a fourth temperature value T4 of the fourth controllable switch 212, thereby correspondingly controlling the four controllable switches by four negative closed-loop feedback controls.

It is similar to the feedback control of the two small-power UPSs shown in FIG. 4A, an average temperature value of the first temperature value T1, the second temperature value T2, the third temperature value T3, and the fourth temperature value T4 is, but not limited to, set to the temperature reference value Tref, namely Tref=¼(T1+T2+T3+T4) in the temperature feedback control of this embodiment. Alternatively, a weighting factor may be introduced to the first temperature value T1, the second temperature value T2, the third temperature value T3, and the fourth temperature value T4 to set the temperature reference value Tref. In the temperature feedback control of the first controllable switch 111, the first temperature value T1 may be set to the temperature feedback value Tfb, namely Tfb=T1, and therefore a temperature error between the temperature reference value Tref and the temperature feedback value Tfb is used to control the turned-on duration of the first controllable switch 111. In the temperature feedback control of the third controllable switch 211, the third temperature value T3 may be set to the temperature feedback value Tfb, namely Tfb=T3, and therefore a temperature error between the temperature reference value Tref and the temperature feedback value Tfb is used to control the turned-on duration of the third controllable switch 211. The same control strategy is applied to the second controllable switch 112 and the fourth controllable switch 212, and therefore the detail descriptions are omitted here for conciseness. Accordingly, the current-sharing control can be implemented for the single large-power UPS, namely the first current value I11 is equal to the second current value I12 and the third current value I21 is equal to the fourth current value I22, and further the four current values I11-I22 are identical in the single large-power UPS. In other words, the first total current value I1 and the second total current value I2 outputted from the power bypass paths of the two large-power UPSs are identical, thereby achieving the bypass current-sharing operation among a plurality of large-power UPSs, such as two UPSs in this embodiment.

Figure 6B:
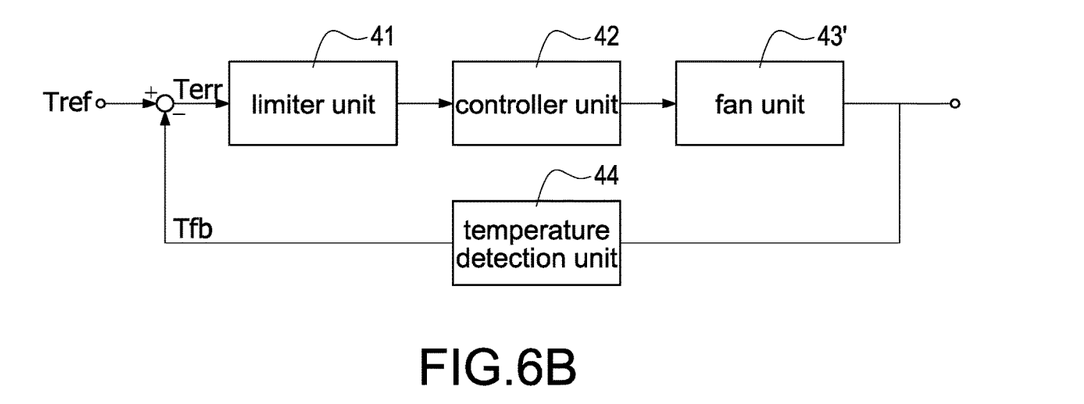
FIG. 6B is a schematic block diagram of controlling a fan unit of the power bypass apparatus with the current-sharing function according to the present disclosure.

Please refer to FIG. 6B, which shows a schematic block diagram of controlling a controllable switch of the power bypass apparatus with the current-sharing function according to the present disclosure. In comparison with the feedback control of the switch turned-on duration of the controllable switch shown in FIG. 6A, a feedback control of a speed of the fan unit shown in FIG. 6B is provided to achieve the bypass current-sharing operation. In the present disclosure, the above-mentioned feedback controls is alternatively used, namely the speed control of the fan unit or the switch control of the controllable switch is alternatively used to achieve the bypass current-sharing operation.

In comparison with the embodiment in FIG. 6A, the control plant shown in FIG. 6B is a fan unit 43'. Also refer to FIG. 4B, the two small-power UPSs respectively provide the first controllable switch 11 and the second controllable switch 21, and therefore two temperature feedback controls are provided in the embodiment shown in FIG. 4A.

Also refer to FIG. 4B, the rotation speed of the two fan units are both controlled under the absence of the limiter unit 41. When the control unit 30 realizes that the first temperature value T1 of the first controllable switch 11 is greater than the second temperature value T2 of the second controllable switch according to the first temperature detection signal St1 and the second temperature detection signal St2, the control unit 30 increases a duty cycle of the first fan control signal Spwm1 to increase a rotation speed of the first fan unit 13 and decreases a duty cycle of the second fan control signal Spwm2 to decrease a rotation speed of the second fan unit 23, thereby decreasing the first temperature value T1 and increasing the second temperature value T2 until the first temperature value T1 is equal to the second temperature value T2. Accordingly, the first current value I1 flowing through the first controllable switch 11 is equal to the second current value I2 flowing through the second controllable switch 21 to achieve the bypass current-sharing operation among a plurality of UPSs, such as two UPSs in this embodiment. In the above-mentioned embodiment, the first switch control signal Sc1 of controlling the first controllable switch 11 and the second switch control signal Sc2 of controlling the second controllable switch 21 are both fully turned-on, namely the trigger angle α thereof is zero.

In another embodiment, the fan control signal of the at least one of the first fan unit 13 and the second fan unit 23 may be controlled by the limiter unit 41, and the detail description of the limiter unit 41 is described in the embodiment of the FIG. 6A and therefore it is omitted here for conciseness. When realizing that the first temperature value T1 of the first controllable switch 11 is greater than the second temperature value T2 of the second controllable switch 21, the control unit 30 may only control increasing the duty cycle of the first fan control signal Spwm1 to increase the rotation speed of the first fan unit 13 (the rotation speed of the second fan unit 23 remains unchanged), thereby decreasing the first temperature value T1. Alternatively, the control unit 30 may only control decreasing the duty cycle of the second fan control signal Spwm2 to decrease the rotation speed of the second fan unit 23 (the rotation speed of the first fan unit 13 remains unchanged), thereby increasing the second temperature value T2. Accordingly, the first current value I1 is equal to the second current value I2 to achieve the bypass current-sharing operation among a plurality of UPSs, such as two UPSs.

Please refer to FIG. 6B, which shows a schematic block diagram of controlling a fan unit of the power bypass apparatus with the current-sharing function according to the present disclosure. Take the two UPSs for example in this embodiment, the rotation speed of the fan unit may be controlled according to the sensed first temperature value T1 and the second temperature value T2, and it should be understood by those skilled in the art that any control manner that achieves the identical temperature can be applied. Further, the fan control signals may be not limited to the PWM signals. If the fan units are voltage-controlled fans, the fan control signals may be the voltage-controlled signals, and it should be understood by those skilled in the art that the fan control signal is appropriately applied to the corresponding fan units.

Figure 8:
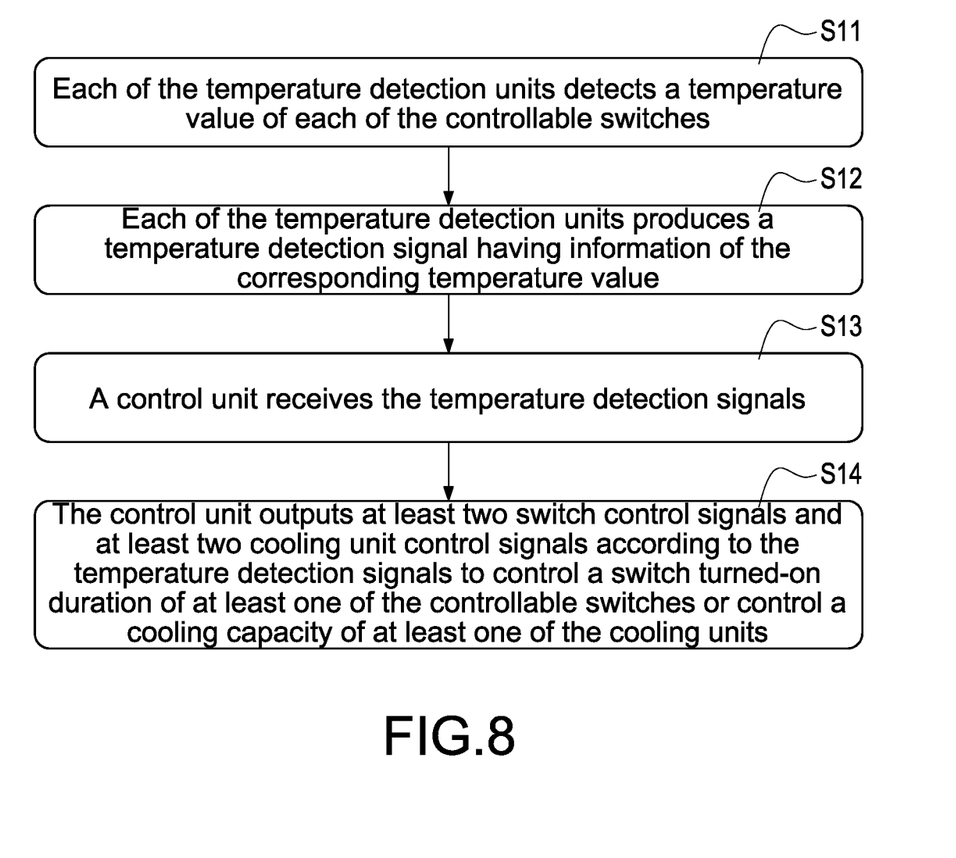
FIG. 8 is a flowchart of a current-sharing control method of the present disclosure.

Please refer to FIG. 8, which shows a flowchart of a current-sharing control method of the present disclosure. The current-sharing control method is applied to a power bypass apparatus having at least two power supplies. The power bypass apparatus includes at least two bypass switch assemblies and a control unit. Each of the bypass switch assemblies includes a controllable switch and a temperature detection unit. Also, each of the controllable switches has a negative temperature coefficient (NTC) characteristic. For example, the controllable switch may be a triode AC semiconductor switch (TRIAC), and at least one control signal is provided to control a trigger angle of the TRIAC to adjust a turned-on duration of at least one of the controllable switches. In addition, the controllable switch may be a silicon controlled rectifying module composed of two silicon controlled rectifiers connected inverse parallel to each other, and at least one of the switch control signals correspondingly control a trigger angle of the silicon controlled rectifying module so that the turned-on duration of the at least one of the controllable switches is controlled.

The current-sharing control method includes following steps. First, each of the temperature detection units correspondingly detects a temperature value of each of the controllable switches (S11). Each temperature detection unit includes a first temperature detection unit and a second temperature detection unit for detecting a temperature value of the first controllable switch and that of the second controllable switch in real time. Each of the controllable switches may be correspondingly disposed on a heat dissipation unit. Moreover, the power bypass apparatus further includes at least two cooling units which are correspondingly disposed on the heat dissipation units. For example, the at least two cooling units include a first cooling unit and a second cooling unit. The first controllable switch is corresponding to the first cooling unit and the second controllable switch is corresponding to the second cooling unit, and the first cooling unit and the second cooling unit are used to remove heat generated by the first controllable switch and the second controllable switch according to a cooling capacity of the first cooling unit and that of the second cooling unit.

Afterward, each of the temperature detection units produces a temperature detection signal having information of the corresponding temperature value (S12), and the control unit receives the temperature detection signals (S13). Therefore, the control unit can acquire a temperature value of the first controllable switch and a temperature value of the second controllable switch according to the temperature detection signals.

Finally, the control unit outputs at least two switch control signals and at least two cooling unit control signals according to the temperature detection signals to control a switch turned-on duration of at least one of the first controllable switch and the second controllable switch or control a cooling capacity of at least one of the first cooling unit and the second cooling unit so that a current value flowing through the first controllable switch is equal to that flowing through the second controllable switch (S14). In other words, any one of the current-sharing control scenarios including the switch turned-on duration control and the cooling capacity control can be alternatively implemented. In the current-sharing control for the controllable switches, the control unit decreases the switch turned-on duration of the controllable switch to decrease the current flowing through the controllable switch so that the current values flowing through the controllable switches are identical to implement the current-sharing function. In the cooling capacity control for the cooling units, the control unit increases the cooling capacity of the cooling unit to decrease the current flowing through the controllable switch or decreases the cooling capacity of the cooling unit to increase the current flowing through the controllable switch so that the current values flowing through the controllable switches are identical to implement the current-sharing function.

In conclusion, the present disclosure has following features and advantages:

1. The power bypass apparatus with the current-sharing function and the method of controlling the same are disclosed to avoid the power bypass failure due to the thermal runaway, increase the overall efficiency, and achieve the bypass current-sharing operation in the large-power UPS.

2. Either the switch turned-on duration control of the controllable switch or the capacity of the cooling unit is used to flexibly achieve the bypass current-sharing operation among a plurality of UPSs according to the actual operational requirements.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power bypass apparatus with a current-sharing function comprising:
at least two bypass switch assemblies correspondingly applied to at least two power supplies, and each bypass switch assembly comprising:
a controllable switch disposed on a heat dissipation unit;
a cooling unit correspondingly disposed to the heat dissipation unit, and the cooling unit configured to cool the controllable switch according to a cooling capacity of the cooling unit; and
a temperature detection unit correspondingly disposed to the heat dissipation unit, and the temperature detection unit configured to detect a temperature value of the controllable switch and produce a temperature detection signal having information of the temperature value; and
a control unit coupled to the at least two bypass switch assemblies and configured to receive the temperature detection signals;
wherein the control unit is configured to output at least two switch control signals and at least two cooling unit control signals corresponding to the at least two bypass switch assemblies according to the temperature detection signals, and control a switch turned-on duration of at least one of the controllable switches according to the at least two switch control signals or control a cooling capacity of at least one of the cooling units according to the at least two cooling unit control signals so that current values flowing through the controllable switches are identical.

2. The power bypass apparatus with the current-sharing function in claim 1, wherein the switch turned-on duration of the at least one of the controllable switches is fully turned-on.

3. The power bypass apparatus with the current-sharing function in claim 2, wherein each of the controllable switches has a negative temperature coefficient (NTC) characteristic.

4. The power bypass apparatus with the current-sharing function in claim 3, wherein each of the controllable switches is a triode AC semiconductor switch (TRIAC), and at least one of the switch control signals is configured to correspondingly control a trigger angle of the TRIAC so that the switch turned-on duration of the at least one of the controllable switches is controlled.

5. The power bypass apparatus with the current-sharing function in claim 4, wherein the switch turned-on duration of the TRIAC is decreased, the current value flowing through the TRIAC is decreased; when the switch turned-on duration of the TRIAC is increased, the current value flowing through the TRIAC is increased.

6. The power bypass apparatus with the current-sharing function in claim 3, wherein each of the controllable switches is a silicon controlled rectifying module composed of two silicon controlled rectifiers connected inverse parallel to each other, and at least one of the switch control signals is configured to correspondingly control a trigger angle of the silicon controlled rectifying module so that the switch turned-on duration of the at least one of the controllable switches is controlled.

7. The power bypass apparatus with the current-sharing function in claim 6, wherein the switch turned-on duration of the silicon controlled rectifying module is decreased, the current value flowing through the silicon controlled rectifying module is decreased; when the switch turned-on duration of the silicon controlled rectifying module is increased, the current value flowing through the silicon controlled rectifying module is increased.

8. The power bypass apparatus with the current-sharing function in claim 1, wherein the cooling unit is a fan unit, and the cooling unit control signal is configured to control a speed of the fan unit.

9. The power bypass apparatus with the current-sharing function in claim 8, wherein when the speed is increased, the cooling capacity of the cooling unit is increased so that the temperature value of the controllable switch is decreased and the current value flowing through the controllable switch is decreased; when the speed is decreased, the cooling capacity of the cooling unit is decreased so that the temperature value of the controllable switch is increased and the current value flowing through the controllable switch is increased.

10. A power bypass apparatus with a current-sharing function comprising:
at least two bypass switch assemblies correspondingly applied to at least two power supplies, and each bypass switch assembly comprising:
a first controllable switch disposed on a heat dissipation unit;
a second controllable switch disposed on the heat dissipation unit and coupled in parallel to the first controllable switch;
a cooling unit correspondingly disposed to the heat dissipation unit, and the cooling unit configured to cool the first controllable switch and the second controllable switch according to a cooling capacity of the cooling unit; and
a temperature detection unit correspondingly disposed to the heat dissipation unit, and the temperature detection unit configured to detect a temperature value of the first controllable switch and the second controllable switch and produce a temperature detection signal having information of the temperature value; and
a control unit coupled to the at least two bypass switch assemblies and configured to receive the temperature detection signals;
wherein the control unit is configured to output at least two switch control signals and at least two cooling unit control signals corresponding to the at least two bypass switch assemblies according to the temperature detection signals, and control a switch turned-on duration of one of the first controllable switch and the second controllable switch according to the at least two switch control signals or control a cooling capacity of at least one of the cooling units according to the at least two cooling unit control signals so that current values flowing through the first controllable switch and the second controllable switch are identical.

11. The power bypass apparatus with the current-sharing function in claim 10, wherein the switch turned-on duration of the at least one of the first controllable switches and the second controllable switches is fully turned-on.

12. The power bypass apparatus with the current-sharing function in claim 11, wherein each of the first controllable switches and the second controllable switches has a negative temperature coefficient (NTC) characteristic.

13. The power bypass apparatus with the current-sharing function in claim 12, wherein each of the first controllable switches and the second controllable switches is a triode AC semiconductor switch (TRIAC), and at least one of the switch control signals is configured to correspondingly control a trigger angle of the TRIAC so that the switch turned-on duration of the at least one of the first controllable switches and the second controllable switches is controlled.

14. The power bypass apparatus with the current-sharing function in claim 12, wherein each of the first controllable switches and the second controllable switches is a silicon controlled rectifying module composed of two silicon controlled rectifiers connected inverse parallel to each other, and at least one of the switch control signals is configured to correspondingly control a trigger angle of the silicon controlled rectifying module so that the switch turned-on duration of the at least one of the first controllable switches and the second controllable switches is controlled.

15. A current-sharing control method applied to a power bypass apparatus having at least two power supplies; the power bypass apparatus comprising at least two bypass switch assemblies and a control unit, and each of the bypass switch assemblies comprising a controllable switch disposed on a heat dissipation unit, a cooling unit correspondingly disposed to the heat dissipation unit, and a temperature detection unit correspondingly disposed to the heat dissipation unit, the current-sharing control method comprising steps of:
detecting a temperature value of each controllable switch unit by each temperature detection unit;
producing a temperature detection signal having information of the temperature value by each temperature detection unit;
receiving the temperature detection signals by the control unit; and
outputting at least two switch control signals and at least two cooling unit control signals corresponding to the at least two bypass switch assemblies according to the temperature detection signals, and controlling a switch turned-on duration of at least one of the controllable switches according to the at least two switch control signals or controlling a cooling capacity of at least one of the cooling units according to the at least two cooling unit control signals so that current values flowing through the controllable switches are identical.

16. The current-sharing control method in claim 15, wherein the switch turned-on duration of the at least one of the controllable switches is fully turned-on.

17. The current-sharing control method in claim 16, wherein each of the controllable switches has a negative temperature coefficient (NTC) characteristic.

* * * * *